United States Patent
Amano et al.

(10) Patent No.: US 10,634,017 B2
(45) Date of Patent: Apr. 28, 2020

(54) VARIABLE VALVE TIMING CONTROL DEVICE

(71) Applicant: AISIN SEIKI KABUSHIKI KAISHA, Kariya-shi, Aichi-ken (JP)

(72) Inventors: Hiroyuki Amano, Kariya (JP); Shigehiro Tanabe, Kariya (JP); Takashi Iwaya, Obu (JP); Yuji Noguchi, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/359,065

(22) Filed: Mar. 20, 2019

(65) Prior Publication Data

US 2019/0353060 A1    Nov. 21, 2019

(30) Foreign Application Priority Data

May 18, 2018   (JP) .................... 2018-096549

(51) Int. Cl.
| | |
|---|---|
| *F01L 1/34* | (2006.01) |
| *F01L 1/344* | (2006.01) |
| *F15B 15/12* | (2006.01) |
| *F15B 15/26* | (2006.01) |
| *F16K 31/06* | (2006.01) |
| *F16K 3/26* | (2006.01) |

(52) U.S. Cl.
CPC ............ *F01L 1/3442* (2013.01); *F15B 15/12* (2013.01); *F15B 15/26* (2013.01); *F16K 3/26* (2013.01); *F16K 31/0613* (2013.01); *F01L 2001/3443* (2013.01); *F01L 2001/34453* (2013.01)

(58) Field of Classification Search
CPC .......... F01L 1/3442; F01L 2001/34453; F01L 2001/3443; F15B 15/12; F15B 15/26; F16K 31/0613; F16K 3/26
See application file for complete search history.

(56) References Cited

U.S. PATENT DOCUMENTS

2010/0319641 A1* 12/2010 Suzuki ................. F01L 1/3442
                                                                    123/90.17
2018/0051599 A1    2/2018 Amano et al.

FOREIGN PATENT DOCUMENTS

JP        2016180318 A     10/2016

* cited by examiner

*Primary Examiner* — Zelalem Eshete
(74) *Attorney, Agent, or Firm* — Buchanan Ingersoll & Rooney PC

(57) ABSTRACT

A variable valve timing control device includes a phase detecting portion; a phase control portion driving an electromagnetic solenoid while obtaining a detection signal detected by the phase detecting portion to set a spool to one of a phase control region and a lock region; and a boundary memory portion memorizing a boundary electric current value for referring a boundary between the phase control region and the lock region when the phase control portion operates a phase control; and a characteristic calculation portion obtaining the boundary electric current value by calculation, the boundary electric current value supporting the boundary between the phase control region and the lock region based on solenoid characteristic information of the electromagnetic solenoid and valve characteristic information of an electromagnetic control valve, the characteristic calculation portion memorizing the boundary electric current value to the boundary memory portion.

5 Claims, 13 Drawing Sheets

VARIABLE VALVE TIMING CONTROL DEVICE

CROSS REFERENCE TO RELATED APPLICATIONS

This application is based on and claims priority under 35 U.S.C. § 119 to Japanese Patent Application 2018-096549, filed on May 18, 2018, the entire content of which is incorporated herein by reference.

TECHNICAL FIELD

This disclosure generally relates to a variable valve timing control device.

BACKGROUND DISCUSSION

A variable valve timing control device disclosed in JP2016-180318A (hereinafter referred to as Patent reference 1) includes an electromagnetic valve controlling a relative rotation phase of an inner rotor and an outer rotor and a lock mechanism. The variable valve timing control device disclosed in Patent reference 1 learns a boundary between a phase control region and a lock region of an operation region of a spool of the electromagnetic valve, and performs a control based on the learning.

That is, the variable valve timing control device disclosed in Patent reference 1 includes a sensor portion detecting the relative rotation phase, and in a case of learning the boundary between the phase control region and the lock region, changes electric current supplied to an electromagnetic solenoid and memorizes an electric current value as a boundary electric current value in a case where the relative rotation phase is changed during the process of the change of the electric current supplied to the electromagnetic solenoid (at a time point when the lock mechanism is shifted in a lock state).

According to the variable valve timing control device disclosed in Patent reference 1, the electromagnetic valve is configured such that the spool is housed in a main body of the variable valve timing control device and the electromagnetic solenoid operating the spool is arranged outside of the main body of the variable valve timing control device. Considering a variance of the performance of the spool (an operating oil control portion including a spool) and the electromagnetic solenoid, the technology learning a boundary electric current as disclosed in Patent reference 1 is effective.

According to the learning disclosed in Patent reference 1, because the variable valve timing control device determines whether the lock mechanism is shifted to be locked by calculating a routine supplying a predetermined electric current to the electromagnetic solenoid in a state where the lock mechanism is unlocked, the same routine shall be repeated by changing of the electric current value supplied to the electromagnetic solenoid in a case where the lock mechanism is not determined to be shifted in the lock state.

Under the circumstances in which the variable valve timing control device repeats the same routine while learning, the learning takes time, and a user may feel uncomfortable by the unstable rotation of an engine in a case where, for example, the variable valve timing control device learns in a state where the engine (internal combustion engine) of a vehicle is operated.

Because the learning requires man-hour per variable valve timing control device according to the learning disclosed in Patent reference 1, issues of time consumption and manufacturing cost increase may be generated.

A need thus exists for a variable valve timing control device which is not susceptible to the drawback mentioned above.

SUMMARY

According to an aspect of this disclosure, a variable valve timing control device includes a driving-side rotational member rotating synchronously with a crankshaft of an internal combustion engine, a driven-side rotational member arranged coaxially with a rotation axis of the driving-side rotational member and rotating integrally with a camshaft which is configured to open and close a valve, an advanced-angle chamber formed between the driving-side rotational member and the driven-side rotational member, a retarded-angle chamber formed between the driving-side rotational member and the driven-side rotational member, a lock mechanism including a lock recessed portion formed at one of the driving-side rotational member and the driven-side rotational member, a biasing member, and a lock member formed at the other of the driving-side rotational member and the driven-side rotational member, the lock member engageable with the lock recessed portion by a biasing force of the biasing member so as to shift a relative rotation phase of the driving-side rotational member and the driven-side rotational member to a lock state between a most retarded-angle phase and a most advanced-angle phase, and an electromagnetic control valve controlling a fluid to be supplied to and discharged from the advanced-angle chamber, the retarded-angle chamber, and the lock recessed portion. The electromagnetic control valve includes a spool controlling supply and discharge of the fluid, and an electromagnetic solenoid operating the spool against a biasing force of a spring by coming in contact with an outer end of the spool. The spool includes operating regions which are a phase control region where the spool supplies the fluid to one of the advanced-angle chamber and the retarded-angle chamber in a state where the spool supplies the fluid to the lock recessed portion, and a lock region where the spool supplies the fluid to one of the advanced-angle chamber and the retarded-angle chamber in a state where the spool discharges the fluid from the lock recessed portion. The variable valve timing control device further includes a phase detecting portion detecting the relative rotation phase, a phase control portion driving the electromagnetic solenoid while obtaining a detection signal detected by the phase detecting portion to set the spool to one of the phase control region and the lock region, a boundary memory portion memorizing a boundary electric current value for referring a boundary between the phase control region and the lock region when the phase control portion operates a phase control, and a characteristic calculation portion obtaining the boundary electric current value by calculation, the boundary electric current value supporting the boundary between the phase control region and the lock region based on solenoid characteristic information of the electromagnetic solenoid and valve characteristic information of the electromagnetic control valve, the characteristic calculation portion memorizing the boundary electric current value to the boundary memory portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the disclosure will hereunder be explained with reference to the drawings.

Figure 1:
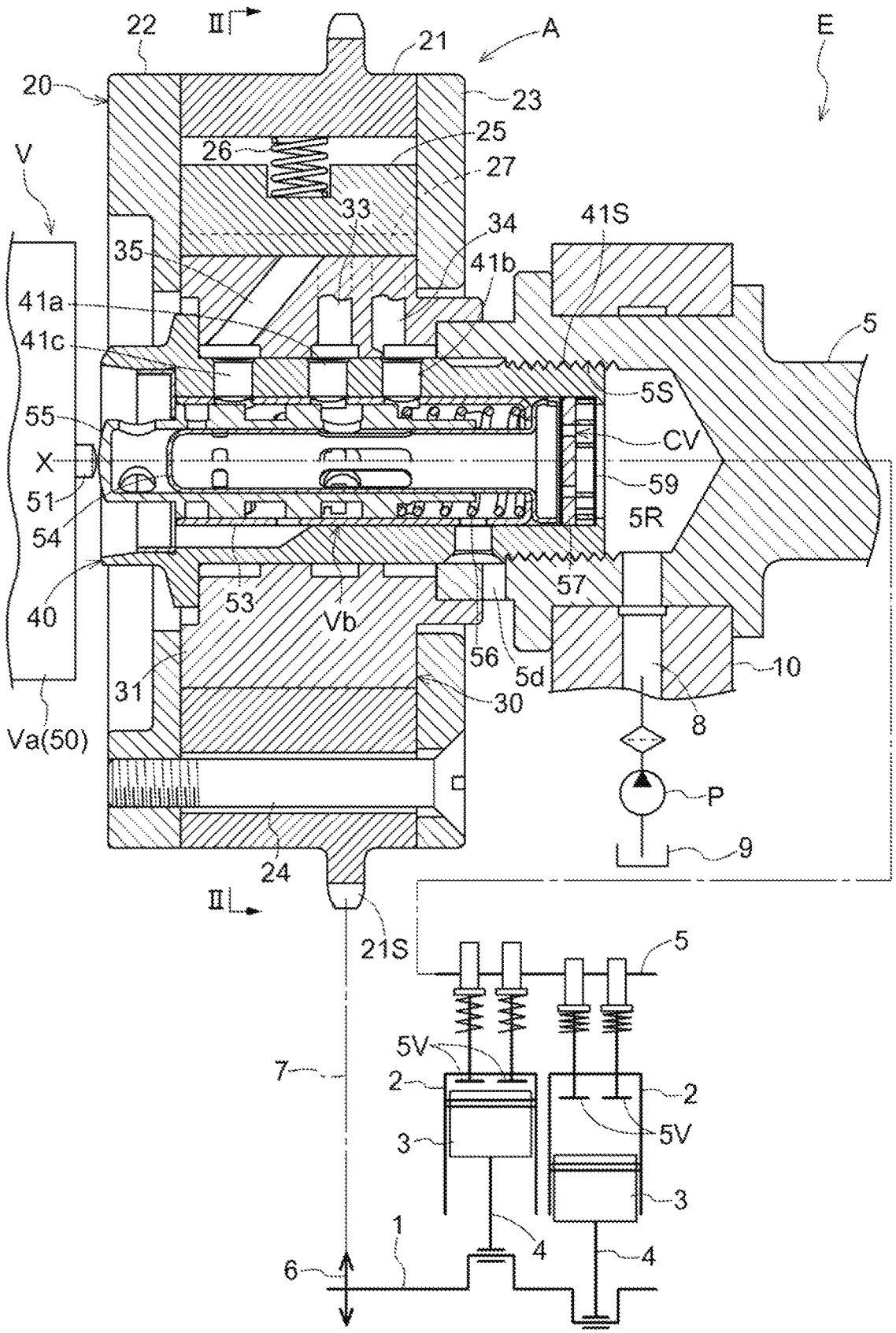
FIG. 1 is a cross sectional view of a variable valve timing control device according to an embodiment disclosed here.
Figure 2:
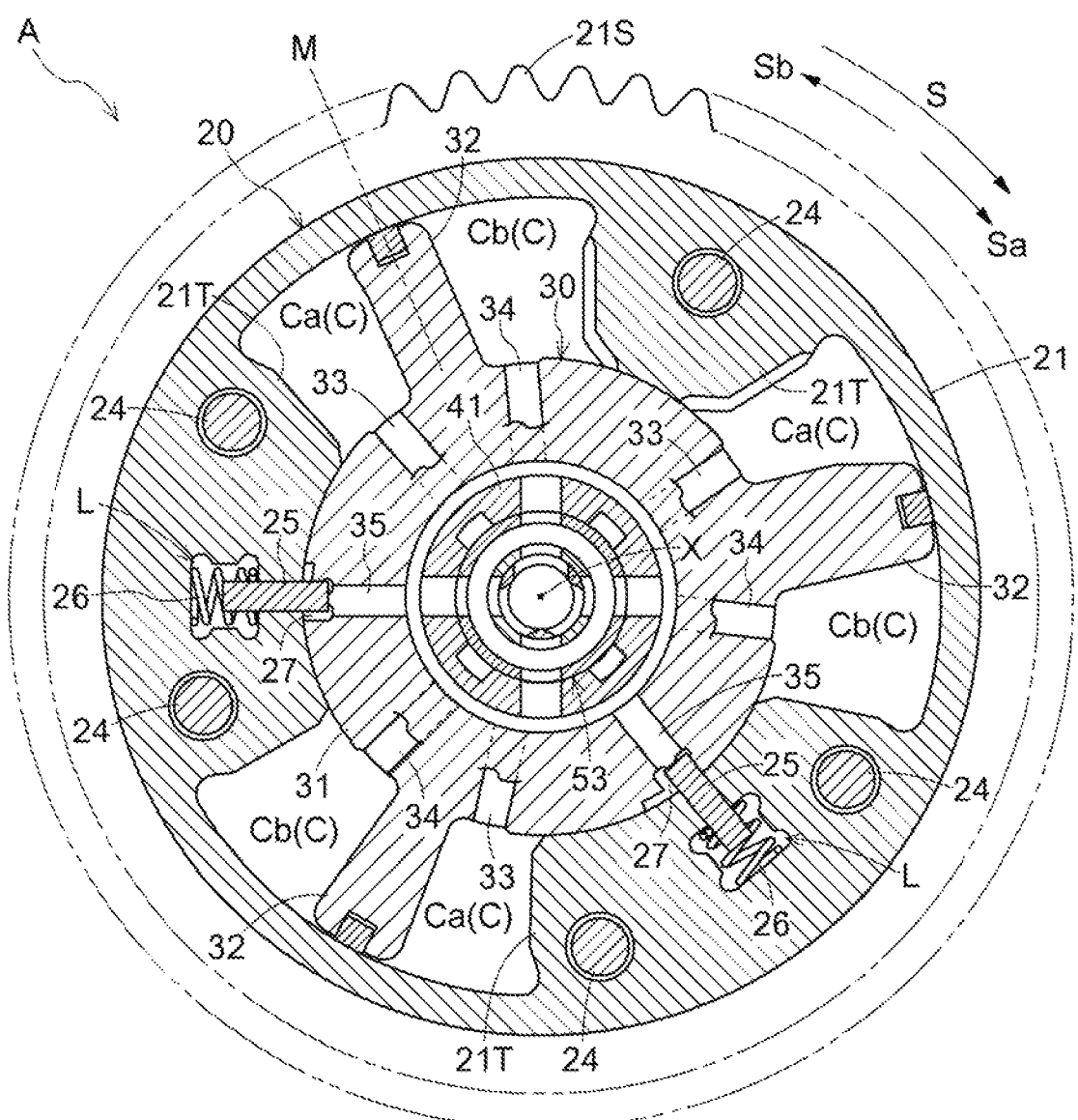
FIG. 2 is a cross sectional view taken along line II-II in FIG. 1.
Figure 10:
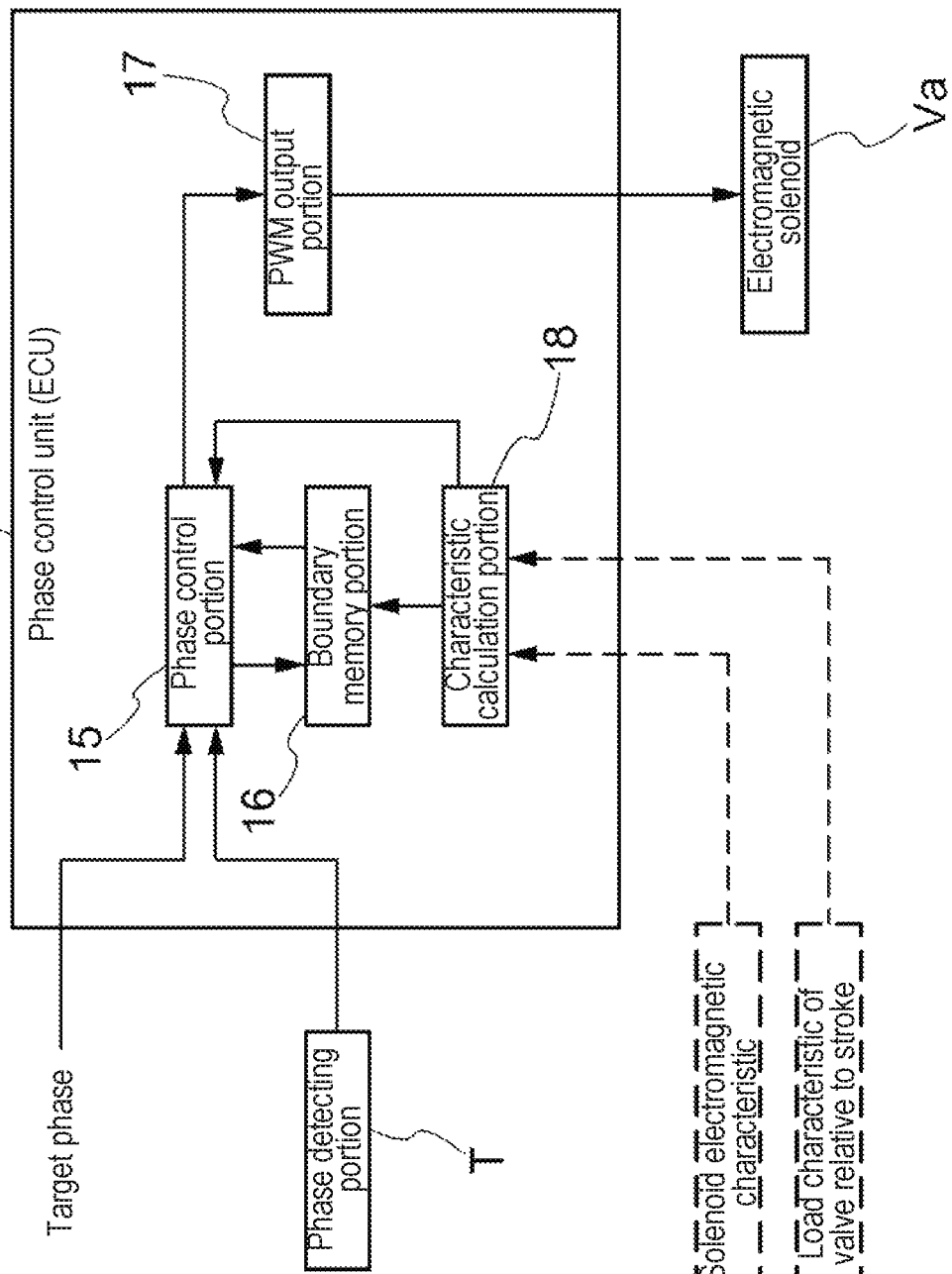
FIG. 10 is a block circuit diagram of a control circuit.

As illustrated in FIGS. 1 and 2, a variable valve timing control device A includes an outer rotor 20 serving as a driving-side rotational member, an inner rotor 30 serving as a driven-side rotational member, and an electromagnetic control valve V for controlling operating oil serving as fluid. As illustrated in FIG. 10, the variable valve timing control device A includes a phase control unit B setting a relative rotation phase to a targeted phase by controlling the electromagnetic control valve V based on detection signals detected by a phase detecting portion T in a case where the target phase of the relative rotation phase is specified.

The variable valve timing control device A of the embodiment is coaxial with a rotation axis X of an intake camshaft 5 (i.e., serving as a camshaft) to set the opening and closing timing of the intake camshaft 5 of an engine E (an example of an internal combustion engine) of an automobile or the like.

The inner rotor 30 (an example of the driven-side rotational member) is coaxially arranged with the rotation axis X of the intake camshaft 5, and integrally rotates with the intake camshaft 5 by being connected to the intake camshaft 5 with a connection bolt 40. The outer rotor 20 (an example of the driving-side rotational member) contains the inner rotor 30 and synchronously rotates with a crankshaft 1 of the engine E by being coaxially arranged with the rotation axis X. In this configuration, the outer rotor 20 and the inner rotor 30 are relatively rotatable with each other.

The variable valve timing control device A includes a lock mechanism L retaining the relative rotation phase of the outer rotor 20 and the inner rotor 30 at an intermediate lock phase M shown in FIG. 2. The relative rotation phase of the outer rotor 20 and the inner rotor 30 is at the intermediate lock phase M at a time point of opening and closing valves suitable for starting up the engine E, and is controlled to be shifted to when the engine E is controlled to be stopped. The intermediate lock phase M corresponds to a phase between a most-retarded-angle phase which is a mechanical limit in a retarded-angle direction Sb shown in FIG. 2, and a most-advanced-angle phase which is a mechanical limit in an advanced-angle direction Sa, and is not limited to a specific phase.

The electromagnetic control valve V is provided with an electromagnetic solenoid Va and a valve unit Vb supported by the engine E. The valve unit Vb includes the connection bolt 40 and a spool 55 housed in an inner space 40R of the connection bolt 40.

The electromagnetic solenoid Va includes a solenoid portion 50 and a plunger 51 extending and retracting relative to the solenoid portion 50. The valve unit Vb includes the spool 55 which is coaxially arranged with the rotation axis X and which controls supplying and discharging operating oil (an example of fluid). A positional relation is set such that a protruding end of the plunger 51 is in contact with an outer end of the spool 55.

The electromagnetic control valve V sets the protruding amount of the plunger 51 by the control of the electric current supplied to the solenoid portion 50 to operate the spool 55. By the operation of the spool 55, the flow of operating oil is controlled to set the opening and closing timing of the intake valve 53, and the lock mechanism L may be shifted to be locked and unlocked.

As illustrated in FIG. 1, the engine E accommodates pistons 3 in cylinder bores of cylinder blocks 2 which are arranged at an upper position of the engine E, and is configured by 4-cycle type connecting the pistons 3 with the crankshaft 1 by connecting rods 4. The intake camshaft 5 configured to open and close intake valves 5V, and an exhaust camshaft are provided at an upper portion of the engine E.

An engine component member 10 supporting the intake camshaft 5 so as to be rotatable therewith is provided with a supply path 8 supplying operating oil from an oil pressure pump P driven by the engine E. The oil pressure pump P supplies lubricating oil accumulated in an oil pan 9 of the engine E to the valve unit Vb, the lubricating oil serving as operating oil (an example of fluid), via the supply path 8.

A timing chain 7 is wound over an output sprocket 6 provided at the crankshaft 1 of the engine E and a timing sprocket 21S of the outer rotor 20. Accordingly, the outer rotor 20 rotates synchronously with the crankshaft 1. A sprocket is also provided at a front end of the exhaust camshaft, and is wounded with the timing chain 7.

As illustrated in FIG. 2, the outer rotor 20 rotates in a driving rotational direction S by driving force transmitted from the crankshaft 1. A relative rotational direction of the inner rotor 30 rotating the same direction as the driving rotational direction S relative to the outer rotor 20 serves as an advanced-angle direction Sa, and an opposite direction thereof serves as a retarded-angle direction Sb. The variable valve timing control device A sets a relationship between the crankshaft 1 and the intake camshaft 5 so as to enhance an intake compression rate in response to an increase of a displacing amount of the relative rotation phase in the advanced-angle direction Sa, and to reduce the intake compression rate in response to the increase of the displacing amount of the relative rotation phase in the retarded-angle direction Sb.

In the embodiment, the variable valve timing control device A being arranged at the intake camshaft 5 is disclosed. Alternatively, the variable valve timing control device A may be arranged at the exhaust camshaft, or may be arranged at both of the intake camshaft 5 and the exhaust camshaft.

Hereinafter, the outer rotor 20 and the inner rotor 30 will hereunder be explained. As shown in FIG. 1, the outer rotor 20 includes an outer rotor body 21, a front plate 22, and a rear plate 23, which are integrally provided by being fastened with plural fixing bolts 24. The timing sprocket 21S is provided at an outer circumference of the outer rotor body 21.

As shown in FIG. 2, plural protrusions 21T protruding inwardly in a radial direction are provided at the outer rotor body 21. The inner rotor 30 includes an inner rotor body 31 which is formed in a cylindrical shape and which is closely in contact with the protrusions 21T of the outer rotor body 21, and plural vane portions 32 protruding outwardly in the radial direction from an outer circumference of the inner rotor body 31 so as to be in contact with an inner circumferential surface of the outer rotor body 21.

As such, the outer rotor 20 houses the inner rotor 30, and plural fluid pressure chambers C are formed at the outer circumference of the inner rotor body 31 at an intermediate position of the protrusions 21 which are adjacent thereto in the rotational direction. The fluid pressure chamber C is defined by an advanced-angle chamber Ca and a retarded-angle chamber Cb by being divided by the vane portion 32. In addition, the inner rotor body 31 is provided with advanced-angle flow paths 33 each communicating with the advanced-angle chamber Ca and retarded-angle flow paths 34 each communicating with the retarded-angle chamber Cb.

As illustrated in FIGS. 1 and 2, the lock mechanism L includes lock members 25 supported so as to be extended and retracted in the radial direction relative to the two protrusions 21T of the outer rotor 20, lock springs 26 (i.e., serving as a biasing member) biasing the lock members 25 respectively so that the lock members 25 protrude, and lock recessed portions 27 provided at the outer circumference of the inner rotor body 31. The inner rotor body 31 is provided with lock control flow paths 35 each communicating with the lock recessed portion 27.

The lock mechanism L retains the relative rotation phase in the intermediate lock phase M by the simultaneous engagement of the two lock members 25 with the lock recessed portions 27 in a state of being supported by the biasing force of the lock springs 26. The operating oil is supplied to the lock control flow paths 35 in the lock state so that the lock members 25 are released from the lock recessed portions 27, respectively, against the biasing force of the lock springs 26, and the lock mechanism L is unlocked. On the other hand, the operating oil is discharged from the lock control flow paths 35 so that the lock members 25 engage with the lock recessed portions 27, respectively, by the biasing force of the lock springs 26, and the lock mechanism L is locked.

Alternatively, the lock mechanism L may be configured such that the single lock mechanism 25 is engaged with the corresponding single lock recessed portion 27. Also, the lock mechanism L may be guided such that the lock members 25 move along the rotation axis X.

Figure 4:
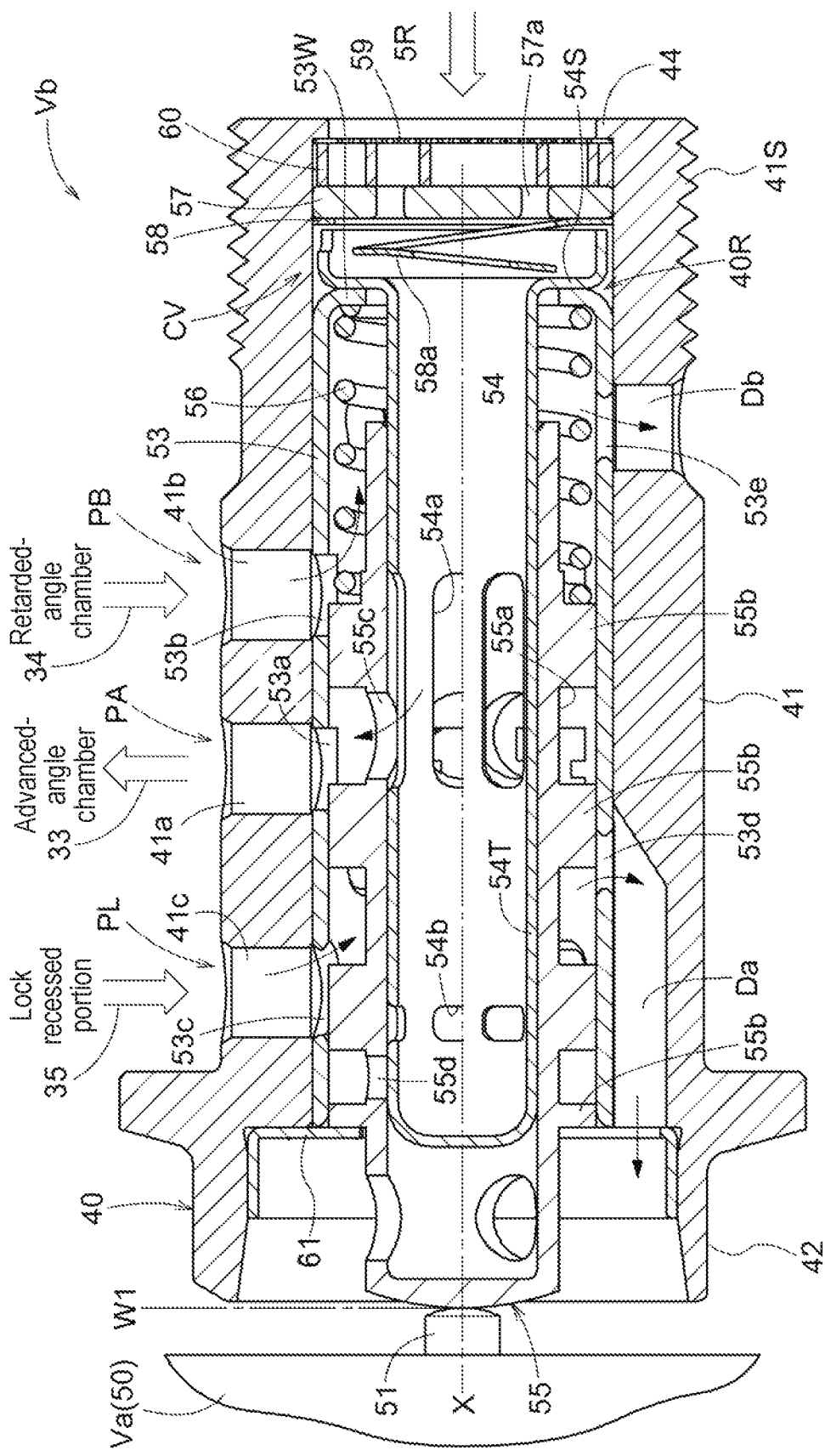
FIG. 4 is a cross sectional view of a valve unit having a spool which is arranged at a first lock region.
Figure 9:
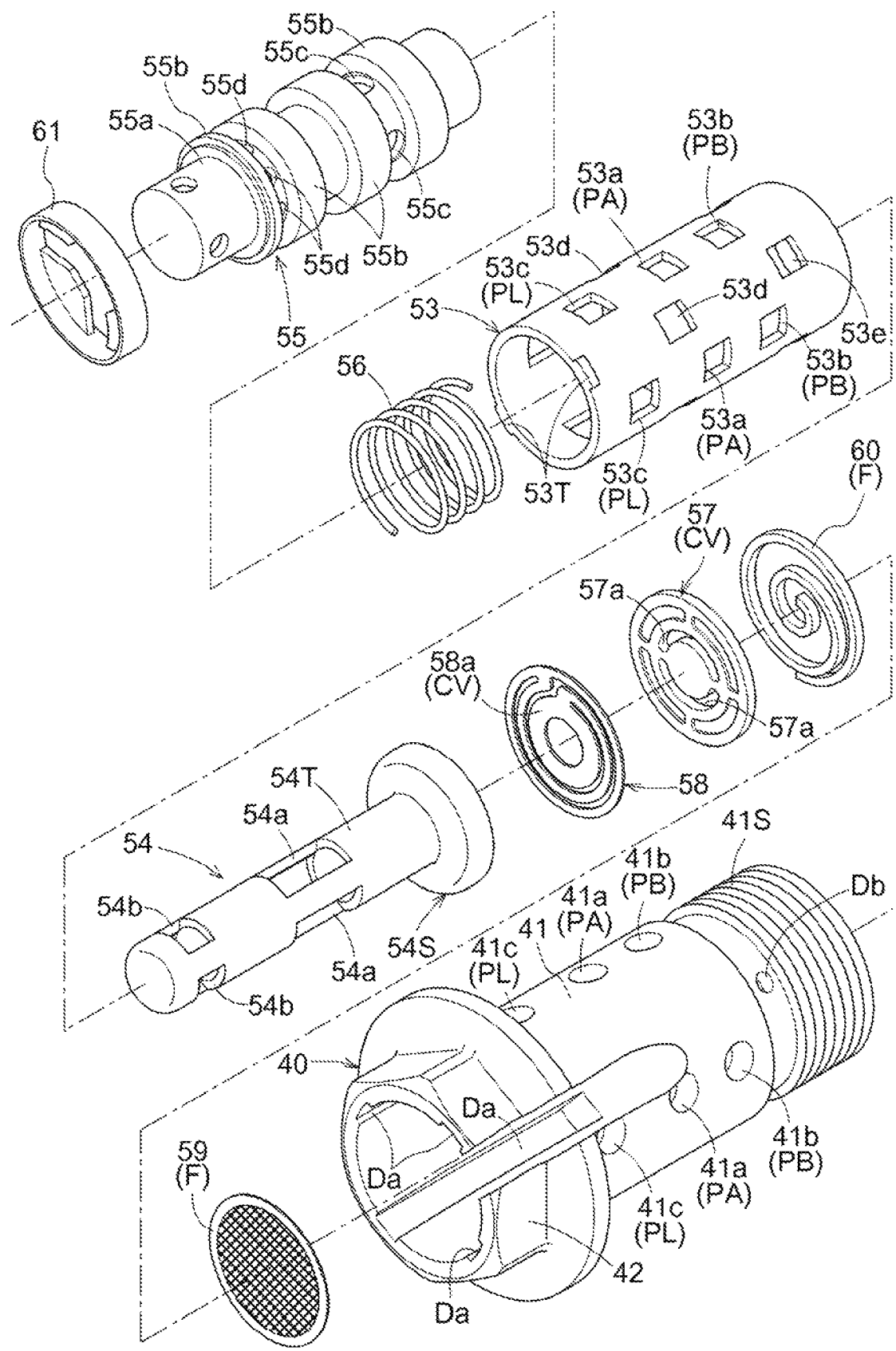
FIG. 9 is an exploded perspective view of the valve unit.

Hereinafter, the connection bolt 40 will hereunder be explained. As shown in FIGS. 1, 4, and 9, the connecting bolt 40 includes a bolt body 41 formed in a cylindrical body as a whole, and a bolt head portion 42 which is provided at an outer end portion (left in FIG. 4) of the bolt body 41. The inner space 40R penetrating in a direction along the rotation axis X is provided inside the connection bolt 40, and a male thread portion 41S is provided at an outer circumference of an inner end portion (right in FIG. 4) of the bolt body 41.

As illustrated in FIG. 1, the intake camshaft 5 is provided with a shaft inner space 5R about the rotation axis X, and a female screw portion 5S is provided at an inner circumference of the shaft inner space 5R. The shaft inner space 5R communicates with the supply flow path 8 and is supplied with the operating oil from the oil pressure pump P.

In this configuration, the bolt body 41 is provided in the inner rotor 30, the male thread portion 41S is threaded onto the female thread portion 5S of the intake camshaft 5, and the inner rotor 30 is fixed to the intake camshaft 5 by the rotation operation of the bolt head portion 42. The inner rotor 30 is fixed to the intake camshaft 5 by this fixation, and the shaft inner space 5R and the inner space 40R of the connecting bolt 40 (specifically, inner space of a fluid supply tube 54) are communicated with each other.

An inner end side (right in FIG. 4) of the inner circumferential surface of the inner space 40R of the connecting bolt 40 in the direction along the rotation axis X is provided with a restriction wall 44 protruding in a direction toward the rotation axis X. As illustrated in FIGS. 4 and 9, plural (four) drain flow paths Da formed in a groove shape are arranged at a region reaching from an intermediate position to a distal end at the inner circumference of the connecting bolt 40 so as to be postured along the rotation axis X, and plural (four) drain holes Db penetrating in the radial direction are provided at the inner end side of the connecting bolt 40.

Hereinafter, the valve unit Vb will hereunder be explained. As shown in FIGS. 1, 4, and 9, the valve unit Vb includes the connecting bolt 40, a sleeve 53 fitted into the inner circumferential surface of the bolt body 41 in a closely-contacted state, a fluid supply pipe 54 which is housed in the inner space 40R so as to be coaxial with the rotation axis X, and the spool 55 which is slidably arranged in the direction along the rotation axis in X a state of being guided by the inner circumferential surface of the sleeve 53 and the outer circumferential surface of a pipe path portion 54T of the fluid supply pipe 54.

The valve unit Vb includes a spool spring 56 (i.e., serving as a spring) which biases the spool 55 in a protruding direction, a check valve CV, an oil filter F, and a fixation ring 61.

As shown in FIG. 9, the check valve CV includes an opening plate 57 and a valve plate 58 which each is made from a metal plate having the same outer diameter. The opening plate 57 is penetrated by plural opening portions 57a at an annular region about the rotation axis X. The valve plate 58 includes an annular valve portion 58a which is configured to close the opening portions 57a of the opening plate 57 when the pressure level is decreased.

The valve plate 58 is made from a spring material, and supplies the operating oil by the valve portion 58a that is being separated from the opening portions 57a of the opening plate 57 when the operating oil is supplied. In a case where the pressure level of the operating oil at the upper stream of the check valve CV is decreased lower than the pressure level thereof at the lower stream thereof, the opening portions 57a of the opening plate 57 are closed in a state of being overlapped by the valve portion 58a of the valve plate 58 to inhibit the counter flow of the operating oil.

An oil filter F includes a filtration member 59 including the same outer diameter as those of the opening plate 57 and the valve plate 58, and a support member 60 supporting the filtration member 59.

In this configuration, the valve unit Vb is assembled such that the filtration member 59, the support member 60, the opening plate 57, and the valve plate 58 are inserted into the inner space 40R of the connection bolt 40, such that the fluid supply pipe 54, the sleeve 53, the spool spring 56, and the spool 55 are inserted into the inner space 40R, and such that a fixation ring 61 is fittingly fixed to an outer end part of the connection bolt 40.

The valve unit Vb assembled as above is configured such that advanced-angle ports PA communicated with the advanced-angle chambers Ca via the advanced-angle flow paths 33, retarded-angle ports PB communicated with the retarded-angle chambers Cb via the retarded-angle flow paths 34, and lock ports PL communicated with the lock recessed portions 27 via the lock control flow paths 35 serve as through holes passing from the bolt body 41 through the sleeve 53 in the radial direction.

The advanced-angle ports PA include advanced-angle through holes 41a, respectively, provided at the bolt body 41 and advanced-angle openings 53a provided at the sleeve 53. The retarded-angle ports PB is provided with retarded-angle through holes 41b, respectively, provided at the bolt body 41 and retarded-angle openings 53b provided at the sleeve 53. The lock ports PL includes lock through holes 41c, respectively, provided at the bolt body 41 and lock openings 53c provided at the sleeve 53.

The plural (for example, four) drain flow paths Da discharging the operating oil to an outer rim side (left in FIG. 4) of the bolt body 41 are provided at the inner circumference of the bolt body 41. The plural drain holes Db are penetrated at an inner rim side (right in FIG. 4) of the bolt body 41.

The drain flow paths Da serve as lock drain flow paths discharging the operating oil from the lock ports PL in a case where the spool 55 is located at a first lock region W1, and serve as phase control drain paths discharging the operating oil from the advanced-angle ports PA in a case where the spool 55 is located at a second lock region W5. The drain holes Db serve as the phase control drain flow paths discharging the operating oil from the retarded-angle ports PB in a case where the spool 55 is located in the first lock region W1 and an advanced-angle region W2. The flow of the operating oil corresponds to a region where the spool 55 is specified or set.

Hereinafter, the sleeve 53 of the valve unit Vb will hereunder be explained. As illustrated in FIGS. 1, 4 and 9, the sleeve 53 includes an end portion wall 53W which is formed in a cylindrical shape about the rotation axis X and which is bent so as to be orthogonal to the rotation axis X by, for example, drawing process at the inner rim side (right in FIG. 4).

The sleeve 53 includes plural (for example, four) advanced-angle openings 53a, plural (for example, four) retarded-angle openings 53b, and plural (for example, four) lock openings 53c. Furthermore, plural (for example, four) first drain openings 53d are provided at an intermediate part of the sleeve 53, and plural (for example, four) second drain openings 53e are provided at the inner rim part of the sleeve 53.

The advanced-angle opening 53a, the retarded-angle opening 53b, and the lock opening 53c are arranged next to one another in the direction along the rotation axis X at four parts in the circumferential direction about the rotation axis X. The first drain opening 53d and the second drain opening 53e are arranged next to each other at four parts in the direction along the rotation axis X such that the phase angles thereof are different from those of the advanced-angle opening 53a, the retarded-angle opening 53b, and the lock opening 53c.

As illustrated in FIG. 9, a pair of engagement protrusions 53T is arranged at an outer rim position of the sleeve 53, and is engaged with engagement recessed portions that are arranged at an opening part of the bolt body 41 to retain the sleeve 53 so as to be unrotatable with the bolt body 41.

As such, because the sleeve 53 is unrotatably retained at the bolt main body 41, as illustrated in FIG. 4, the advanced-angle opening 53a, the retarded-angle opening 53b, and the lock openings 53 are retained in a state of being communicated with the advanced-angle communication hole 41a, the retarded-angle communication hole 41b, and the lock communication hole 41c supporting the advanced-angle opening 53a, the retarded-angle opening 53b, and the lock opening 53c, respectively. The first drain opening 53d and the drain flow path Da are communicated with each other to create a lock drain flow path, and the second drain opening 53e and the drain hole Db are communicated with each other to create a phase control drain flow path. Accordingly, the advanced-angle port PA, the retarded-angle port PB, and the lock port PL are provided. Specifically, the drain hole Db is communicated with a drain through hole 5d provided at the intake camshaft 5 as illustrated in FIG. 1.

Hereinafter, the fluid supply pipe 54 of the valve unit Vb will hereunder be explained. As illustrated in FIGS. 4 and 9, the fluid supply pipe 54 includes a base end portion 54S which is inserted into the internal space 40R, and a pipe path portion 54T having a diameter smaller than the base end portion 54S, the base end portion 54S and the pipe path portion 54T being integrally formed. Plural first supply openings 54a are arranged at positions close to the base end portion 54S at the outer circumference of the distal end portion of the pipe path portion 54T, and plural second supply openings 54b are arranged outwardly of the plural first supply openings 54a.

The plural first supply openings 54a each is formed in an elongated hole having a wide width in the circumferential direction and extending along the rotation axis X. Four intermediate hole portions 55c provided at the spool 55 at the corresponding positions of the first supply openings 54a are each formed in a circular shape. In this configuration, the operating oil delivered from the pipe path portion 54T is securely supplied to the intermediate hole portion 55c.

The second supply openings 54b each is formed in a substantially quadrilateral shape, and plural end hole portions 55d each is formed in a circular shape, the end hole portions 55d arranged at the corresponding position of the second supply openings 54d at the spool 55. In this configuration, the operating oil is securely supplied from the pipe path portion 54T to the end hole portion 55d.

Hereinafter, the spool 55 and the spool spring 56 of the valve unit Vb will hereunder be explained. As illustrated in FIGS. 4 and 9, the spool 55 includes a spool body 55a formed in a cylindrical shape and having a contact surface at the outer end side, and four land portions 55b provided at the outer circumference of the spool body 55a. An inner flow path is provided inside the spool 55, and plural intermediate hole portions 55c communicated with the inner flow path are provided at an intermediate position of the pair of land portions 55b (that is, the land portions 55b sandwich the intermediate hole portion 55c) provided at the inner end side along the rotation axis X. The end hole portions 55d communicated with the inner flow paths are provided at the intermediate position of the pair of land portions 55b (that is, the land portions 55b sandwich the end hole portion 55d) arranged at the outer end side in the direction along the rotation axis X.

The spool spring 56 is a compression coil type and is arranged between the land portion 55b arranged at the inner end side and the end portion wall 53W of the sleeve 53.

The operation mode of the variable valve timing control device A will hereunder be explained. According to the variable valve timing control device A, in a state where the solenoid portion 50 of the electromagnetic solenoid Va is not supplied with an electric current, the pressing force is not applied from the plunger 51 to the spool 55, and as illustrated in FIG. 4, the spool 55 is retained at the position where the land portion 55b arranged outward of the spool spring 56 is in contact with the fixation ring 61 by the biasing force of the spool spring 56.

Figure 3:
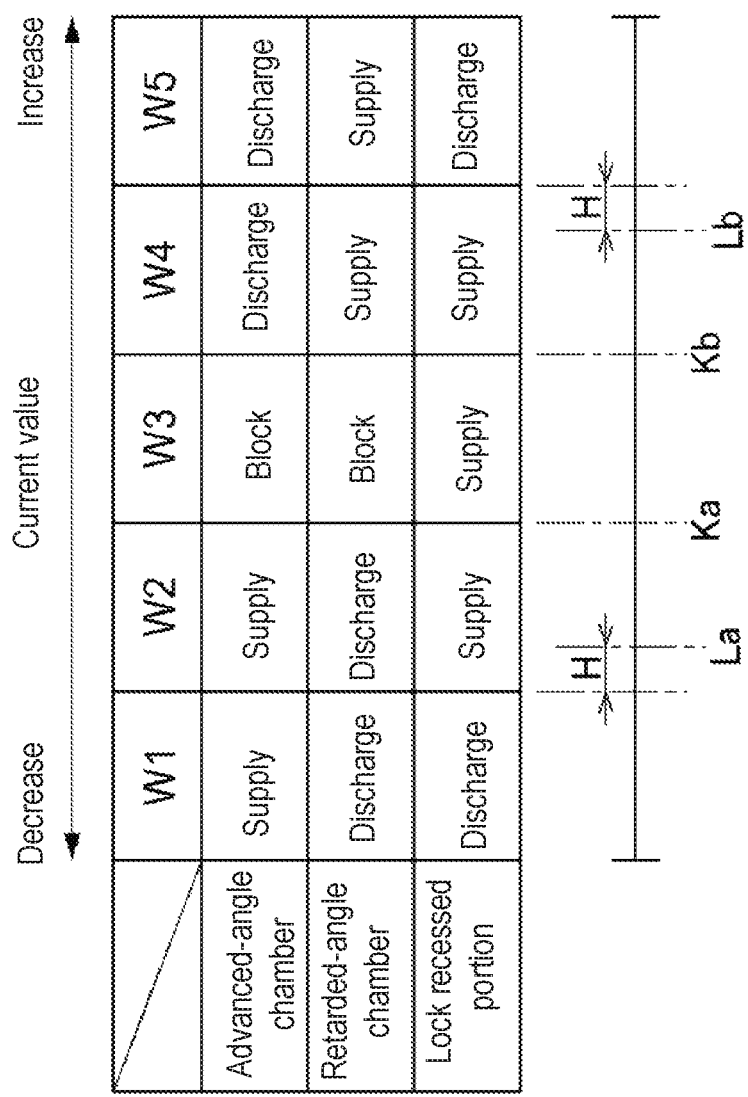
FIG. 3 is a diagram summarizing the relation between a region where a spool is set and the supply and discharge of an operating oil.

The position of the spool 55 illustrated in FIG. 4 corresponds to an outer end position of the first lock region W1. As illustrated in FIG. 3, by the increase of the electric current value supplied to the solenoid portion 50, based on the first lock region W1, the spool 55 may operate in the advanced-angle region W2, a retention region W3, a retarded-angle region W4, and the second lock region W5 in this order. That is, one region of the five regions may be set by the setting of the electric current value supplied to the solenoid portion 50 of the electromagnetic solenoid Va.

Figure 8:
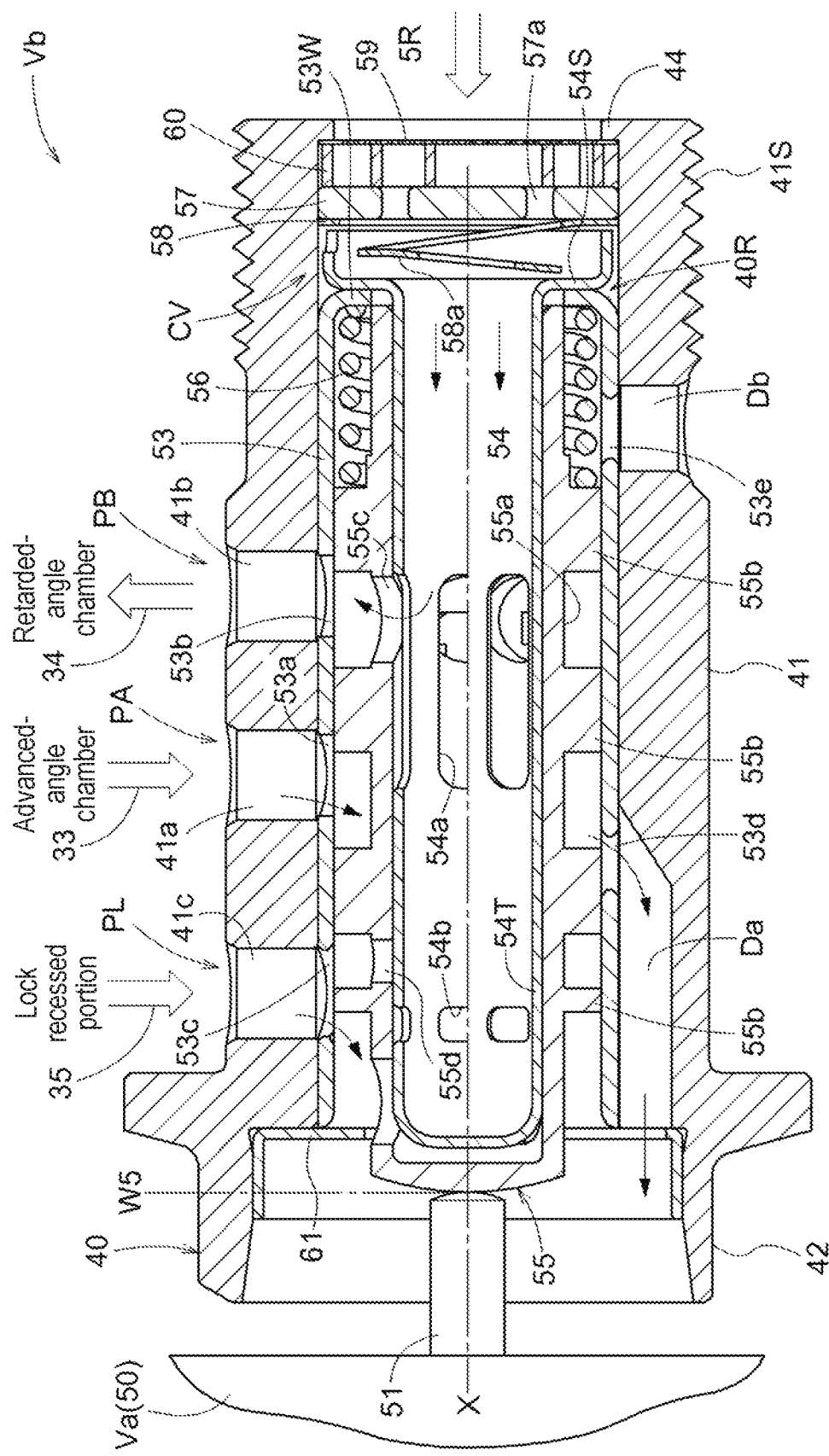
FIG. 8 is a cross sectional view of the valve unit having the spool at a second lock region.

In a state where the solenoid portion 50 is not supplied with the electric current, the spool 55 is retained at the outer end position of the first lock region W1 as illustrated in FIG. 4. As illustrated in FIG. 8, the electric current value supplied to the solenoid portion 50 is maximized so that the spool 55 is set at the outer end of the second lock region W5.

The advanced-angle region W2 and the retarded-angle region W4 of the plural regions correspond to phase control regions, and the first lock region W1 and the second lock region W5 correspond to lock regions.

In the valve unit Vb, in a case where the spool 55 is set at either the first lock region W1 or the second lock region W5, the lock mechanism L is allowed to be shifted in the lock state at a time point when the relative rotation phase reaches the intermediate lock phase M.

An operation mode in a first lock region will hereunder be explained. In a case where the spool 55 is set at the first lock region W1, as illustrated in FIG. 4, the operating oil delivered from the oil pressure pump P is supplied to the advanced-angle chamber Ca via the intermediate hole portion 55c of the spool 55, the advanced-angle port PA, and the advanced-angle flow path 33. At the same time, the operating oil delivered from the retarded-angle chamber Cb is sent to the retarded-angle flow path 34, the retarded-angle port PB, the second drain opening 53e, and the drain hole Db and is discharged outside.

In the first lock region W1, the operating oil in the lock recessed portion 27 is sent to the lock control flow path 35, the lock port PL, the first drain opening 53d, and the drain flow path Da, and is discharged outside.

Accordingly, the relative rotation phase is displaced in the advanced-angle direction Sa, and is shifted in the lock state by engagement of the lock recessed portion 27 with the lock member 25 at a time point when reaching the intermediate lock phase M. The relative rotation phase is maintained in the intermediate lock phase M in a state of being already in the lock state.

Figure 5:
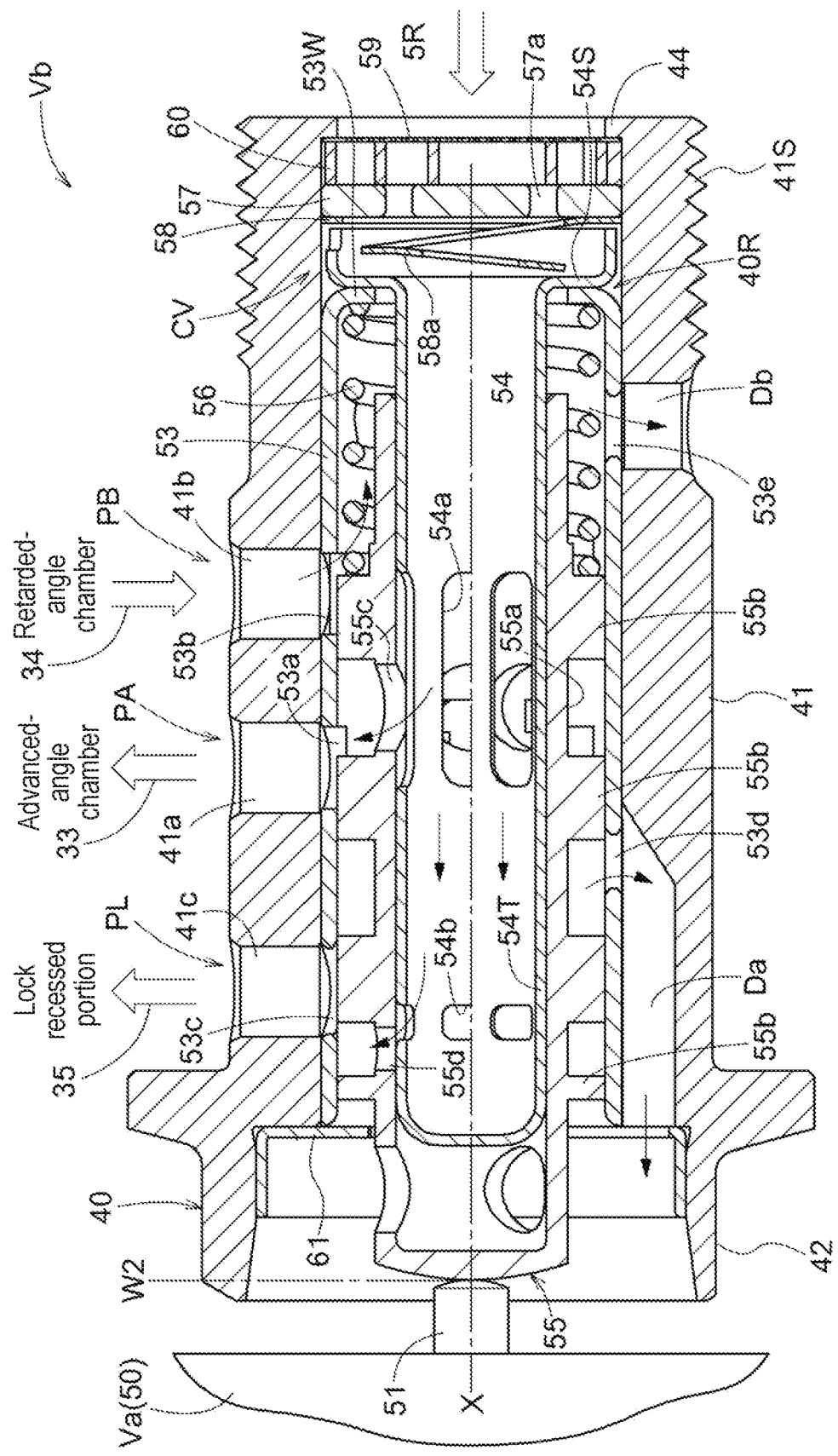
FIG. 5 is a cross sectional view of the valve unit having the spool at an advanced-angle region.

An operation mode in the advanced-angle region W2 will hereunder be explained. In a case where the spool 55 is set at the advanced-angle region W2, as illustrated in FIG. 5, the operating oil delivered from the oil pressure pump P is supplied to the advanced-angle chamber Ca via the intermediate hole portion 55c of the spool 55, the advanced-angle port PA, and the advanced-angle flow path 33 as in a case where the first lock region W1 is set. At the same time, the operating oil delivered from the retarded-angle chamber Cb is sent to the retarded-angle flow path 34, the retarded-angle port PB, the second drain opening 53e, and the drain hole Db, and is discharged outside from the drain through hole 5d.

In the advanced-angle region W2, the operating oil delivered from the oil pressure pump P is supplied to the lock recessed portion 27 via the end hole portion of the spool 55, the lock port PL, and the lock control flow path 35. Accordingly, the lock member 25 is retracted from the lock recessed portion 27 to cause the lock mechanism L to be in the unlock state so that the relative rotation phase is displaced in the advanced-angle direction Sa.

Figure 6:
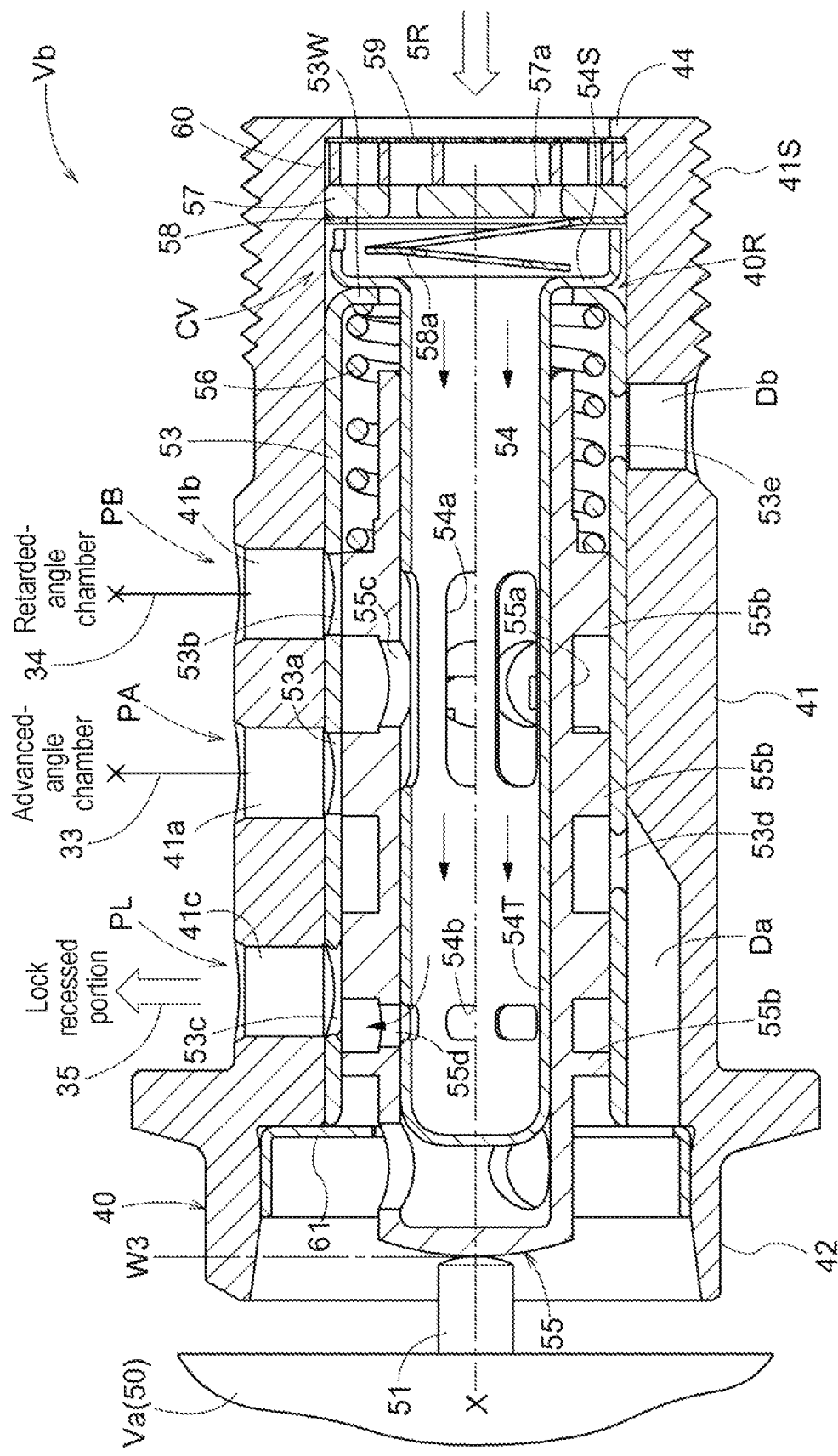
FIG. 6 is a cross sectional view of the valve unit having the spool at a retention region.

An operation mode when the spool 55 is in the retention region W3 will hereunder be explained. In a case where the spool 55 is set at the retention region W3, as illustrated in FIG. 6, the advanced-angle port PA and the retarded-angle port PB are closed by the land portions 55b of the spool 55, and the operating oil is not supplied to the advanced-angle chamber Ca and the retarded-angle chamber Cb. In the retention region W3, the operating oil delivered from the oil pressure pump P is supplied to the lock recessed portion 27 via the end hole portion 55d of the spool 55, the lock port PL, and the lock control flow path 35, and the lock member 25 is retracted from the lock recessed portion 27 to be maintained in the unlock state.

Accordingly, in the retention region W3, the relative rotation phase is not displaced, and is retained unchanged.

Figure 7:
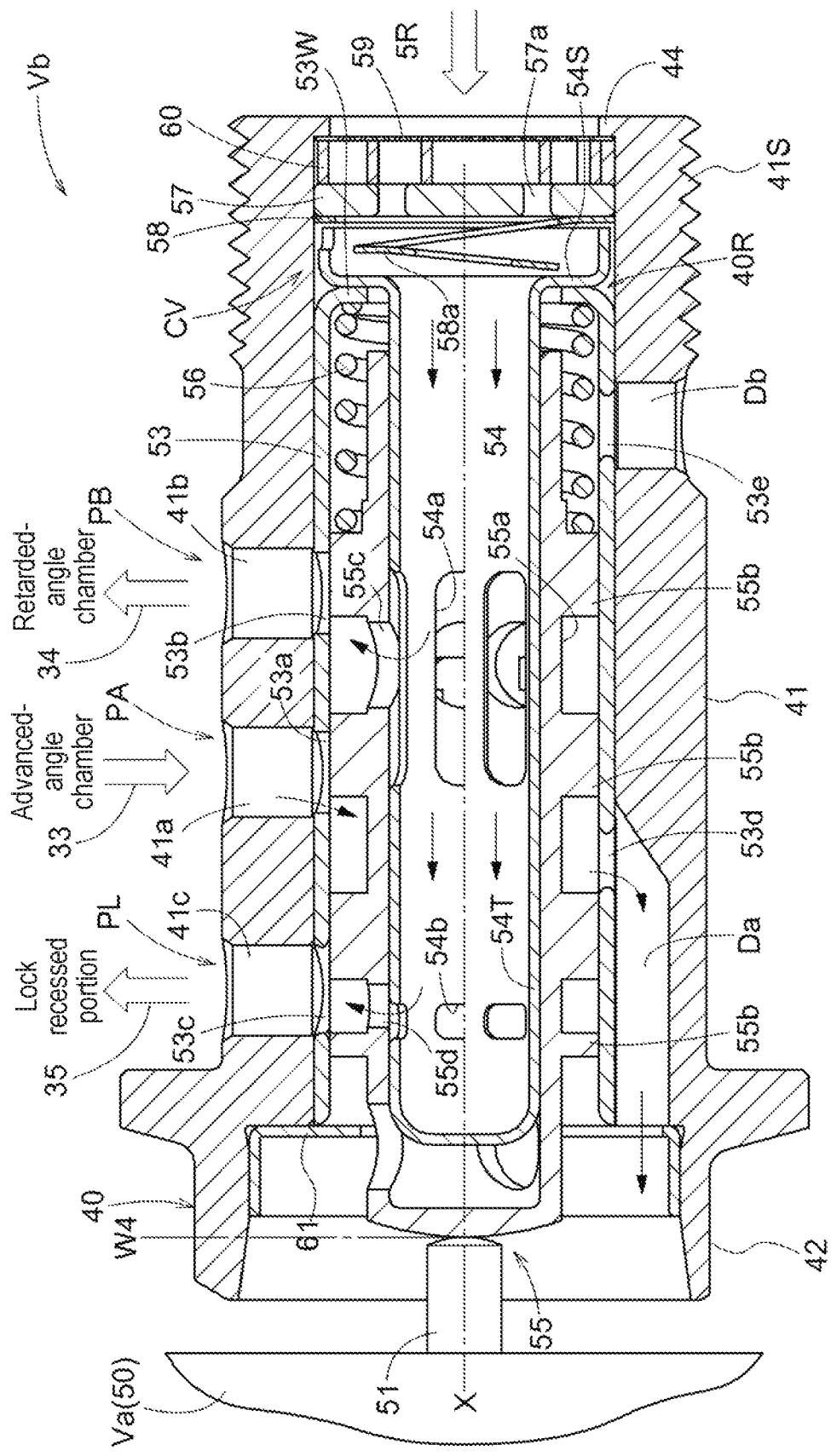
FIG. 7 is a cross sectional view of the valve unit having the spool at a retarded-angle region.

An operation mode when the spool 55 is in the retarded-angle region W4 will hereunder be explained. In a case where the spool 55 is set at the retarded-angle region W4, as illustrated in FIG. 7, the operating oil delivered from the oil pressure pump P is supplied to the retarded-angle chamber Cb via the intermediate hole portion 55c of the spool 55, the retarded-angle port PB, and the retarded-angle flow path 34. At the same time, the operating oil delivered from the advanced-angle chamber Ca is sent to the advanced-angle flow path 33, the advanced-angle port PA, the first drain opening 53d, and the drain hole Da, and is discharged outside.

In the retarded-angle region W4, the operating oil delivered from the oil pressure pump P is supplied to the lock recessed portion 27 via the end hole portion 55d of the spool 55, the lock port PL, and the lock control flow path 35. Accordingly, the lock member 25 is retracted from the lock recessed portion 27 to cause the lock mechanism L to be in the unlock state so that the relative rotation phase is displaced in the retarded-angle direction Sb.

An operation mode when the spool 55 is in the second lock region W5 will hereunder be explained. In a case where the spool 55 is set at the second lock region W5, as illustrated in FIG. 8, the operating oil delivered from the oil pressure pump P is supplied to the retarded-angle chamber Cb via the intermediate hole portion 55c of the spool 55, the retarded-angle port PB, and the retarded-angle flow path 34. At the same time, the operating oil delivered from the advanced-angle chamber Ca is sent to the advanced-angle flow path 33, the first drain opening 53d, and the drain hole Da and is discharged outside.

In the second lock region W5, the operating oil delivered from the lock recessed portion 27 is sent to the inner space of the sleeve 53 via the lock control flow path 35 and the lock port PL, and is discharged outside in a state where the operating oil passes through the inner circumference of the fixation ring 61 from the outer end of the spool 53 (the left end in FIG. 8).

Accordingly, the relative rotation phase is displaced in the retarded-angle direction Sb, and the lock member 25 is engaged with the lock recessed portion 27 to be shifted in the lock state at a time point when the relative rotation phase reaches the intermediate lock phase M. In a case where the lock member 27 is in the lock state, the relative rotation phase is retained in the intermediate lock phase M.

The structure of the advanced-angle port and the retarded-angle port will hereunder be explained. As described above, in a case where the spool 55 is set at either the first lock region W1 or the second lock region W5, the lock mechanism L reaches the lock state at a time point when the relative rotation phase is displaced to reach the intermediate lock phase M.

The phase control unit B will hereunder be explained. As illustrated in FIG. 10, the phase control unit B includes a phase control portion 15, a boundary memory portion 16, a pulse-width-modulation (PWM) output portion 17, and a characteristic calculation portion 18. The PWM output portion 17 supplies the electric current to the electromagnetic solenoid Va.

In the configuration, the phase control portion 15 and the characteristic calculation portion 18 are assumed to be configured by software, however, a part of the characteristic calculation portion 18 may be configured by hardware, for example, a logic circuit. The boundary memory portion 16 is configured by combination of software and hardware including a non-volatile memory. The PWM output portion 17 includes, for example, a switching element controlling electric current from a power supply. The electric current from the power supply is turned on and off at a certain period by the switching element and so forth, and the electric current value may be set by PWM setting a time to turn on the electric current during the period.

The phase control unit B is inputted with signals from a phase detecting portion T detecting the relative rotation phase of the outer rotor 20 and the inner rotor 30. The phase detecting portion T is assumed as a portion calculating the relative rotation phase based on the signals obtained by a crankshaft sensor detecting the rotation angle of the crankshaft 1 and by a camshaft sensor detecting the rotation angle of the intake camshaft 5. Alternatively, a dedicated sensor detecting the relative rotation phase may be employed.

In a case where a target phase is set, the phase control unit B supplies the electric current to the electromagnetic solenoid Va so as to control the operation position (for example, the target position including the advanced-angle region W2) of the spool 55 in a state of giving the detection signals of the phase detecting portion T as a feedback based on, for example, Proportional-Integral-Differential control or PID control, to minimize the deviation between the target phase and an actual phase (the relative rotation phase) detected by the phase detecting portion T.

The aforementioned phase control is to set the spool 55 of the electromagnetic control valve V at the advanced-angle region W2 and the retarded-angle region W4. However, for example, the spool 55 may be entered into the first lock region W1 and the second lock region W5 unintentionally in a case where, for example, the spool 55 is set close to the first lock region W1 and the second lock region W5 to displace the relative rotation phase in high speed (to increase the opening of the advanced-angle port PA or the retarded-angle port PB). In order not to make the spool 55 enter into the lock region unintentionally, a boundary electric current value (a first boundary electric current value La and a second boundary electric current value Lb) and a retention electric current value (a first retention boundary electric current value Ka and a second retention boundary electric current value Kb) that are stored in the boundary memory portion 16 are referred when the phase control is operated.

The calculation at the phase control unit will hereunder be explained. In the variable valve timing control device A, in a case where reasonable performance designed by the electromagnetic control valve V is obtained, the operating amount of the spool 55 relative to the electric current value supplied to the electromagnetic solenoid Va may be a predetermined reasonable value.

However, because the electromagnetic control valve V is combined by the electromagnetic solenoid Va and the valve unit Vb, the relationship between the electric current value supplied to the electromagnetic solenoid Va and the operation position of the spool 55 may be out of the designed position due to the variance of the characteristics of the electromagnetic solenoid Va and the valve unit Vb.

As such, in a case where the relationship may be out of the designed position, the first boundary electric current value La serving as a boundary between the first lock region W1 and the advanced-angle region W2 and the second boundary electric current value Lb serving as a boundary between the retarded-angle region W4 and the second lock region W5 may not be set reasonably.

Similarly, as illustrated in FIG. 3, the first retention boundary electric current value Ka (an example of the retention electric current value) corresponding to the boundary between the advanced-angle side of the retention region W3 and the second retention boundary electric current value Kb (an example of the retention electric current value) corresponding to the boundary between the retarded-angle region W4 side cannot be specified.

To specify these boundary electric current values, when the engine E is driven, each of the boundary electric current value may be set by the learning of, for example, the measurement of the position of the spool 55, the measurement of the supply and discharge amounts of the operating oil at the spool 55, and the determination of the operation of the lock mechanism L. However, the learning process may consume time and is required to attach dedicated sensors to a vehicle so that a technology setting the boundary electric current values without operating the learning process is preferred.

Figure 11:
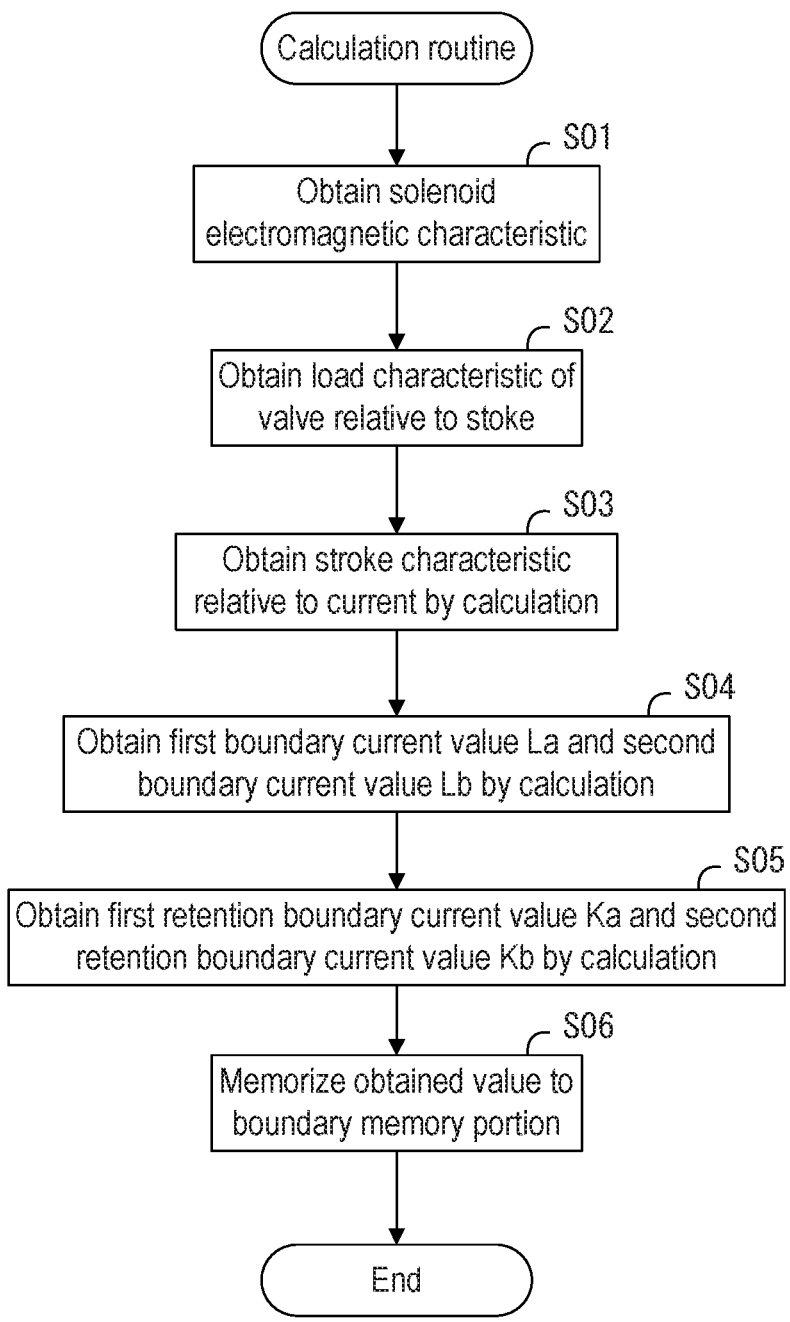
FIG. 11 is a flowchart of a calculating routine.

From this reason, in the variable valve timing control device A, a characteristic calculation portion 18 operates a calculating routine when the electromagnetic control valve V is assembled shown in a flowchart in FIG. 11.

That is, solenoid characteristic information of the electromagnetic solenoid Va is applied to each of the electromagnetic solenoids Va when being manufactured. Similarly, valve characteristic information of the valve unit Vb is applied to each of the valve units Vb when being manufactured.

Figure 12:
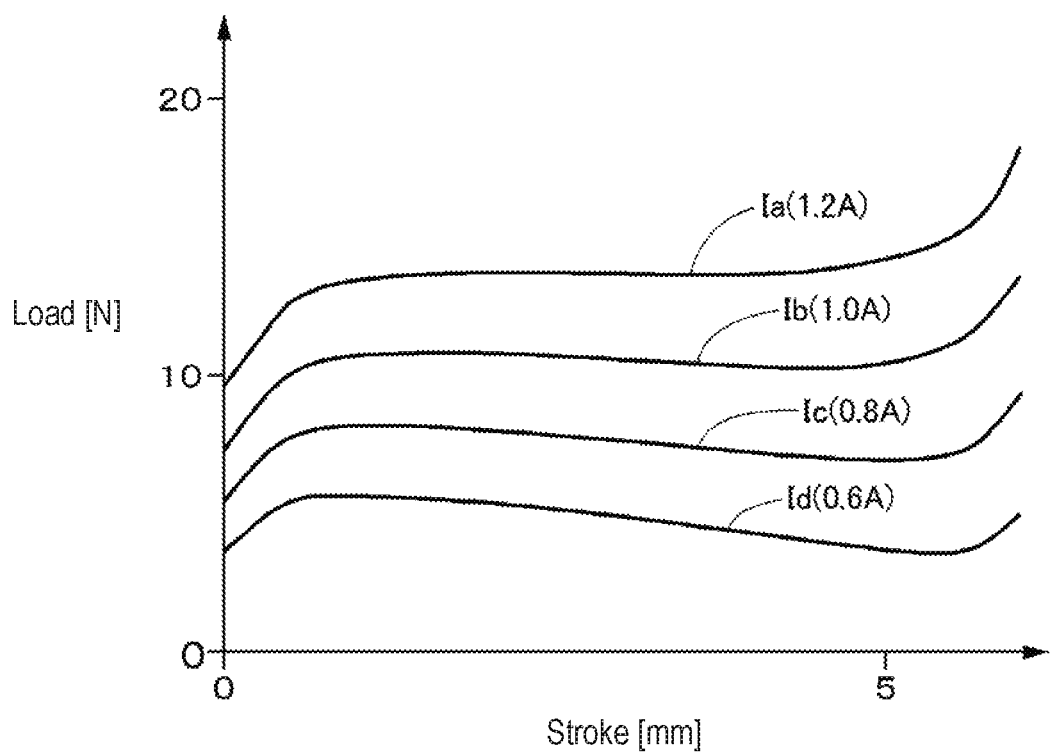
FIG. 12 is a graph illustrating solenoid electromagnetic characteristics.

As a specific example of the characteristic information, FIG. 12 graphically shows solenoid electromagnetic characteristics of the electromagnetic solenoid Va. In the graph in FIG. 12, a longitudinal axis corresponds to a load (expressed in the unit Newton (N)) and a lateral axis corresponds to a stroke of the spool 55 (expressed in the unit mm (millimeter)). Plural graphs Ia, Ib Ic, Id shown in FIG. 12 show the relationships between the power and the stroke when the electric currents of the different electric current values are supplied to the electromagnetic solenoid Va.

The solenoid electromagnetic characteristics are the values measured by a dedicated measurement device at a time point when the manufacturing process of the electromagnetic solenoid is completed. Specific values of the plural graphs Ia, Ib Ic, Id shown in FIG. 12 are, for example, 1.2 A, 1.0 A, 0.8 A, and 0.6 A.

Figure 13:
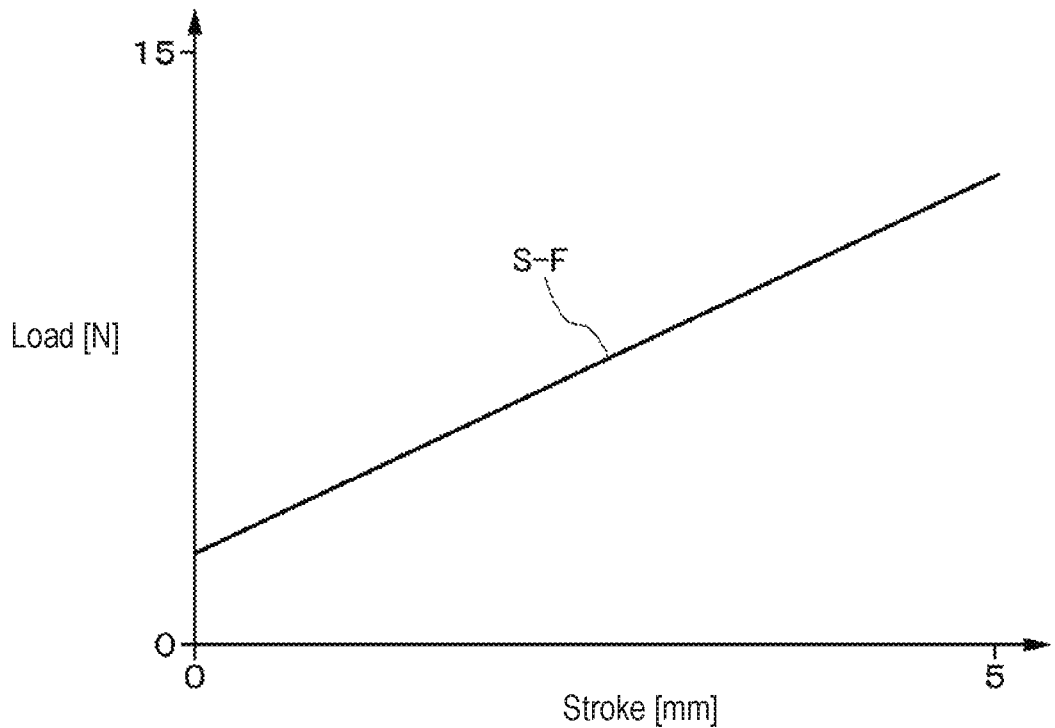
FIG. 13 is a graph illustrating a load characteristic of a valve relative to a stroke.

As a specific example of the characteristic information, FIG. 13 graphically shows a load characteristic of a valve relative to a stroke. In the graph in FIG. 13, a longitudinal axis corresponds to a power (Newton), a lateral axis corresponds to a stroke of the spool 55 (mm), and FIG. 13 shows the load characteristic of the valve relative to the stroke S-F.

The load characteristic of the valve relative to the stroke corresponds to a value measured by a dedicated measurement device at a time point when the manufacturing of the electromagnetic solenoid is completed.

The characteristic information is managed as data related to, for example, serial numbers applied individually to the electromagnetic solenoid Va and the valve unit Vb, or is individually applied to the electromagnetic solenoid Va and the valve unit Vb as a QR code® (which is a Registered Trademark) which is a two-dimensional code of the characteristic information to be sent to the manufacturing line of the engine E.

As illustrated in a flowchart in FIG. 11, in the manufacturing line, the solenoid electromagnetic characteristics of the electromagnetic solenoid Va and the load characteristic of the valve relative to the stroke of the valve unit Vb, the electromagnetic solenoid Va and the valve unit Vb assembled in the engine E, are obtained (Step S01, S02).

The solenoid electromagnetic characteristics and the load characteristic of the valve relative to the stroke may be obtained such that the corresponding characteristic information based on, for example, serial numbers of the electromagnetic solenoid Va and the valve unit Vb is obtained by network, or such that the QR codes® attached to the electromagnetic solenoid Va and the valve unit Vb are scanned by a code reader.

Figure 14:
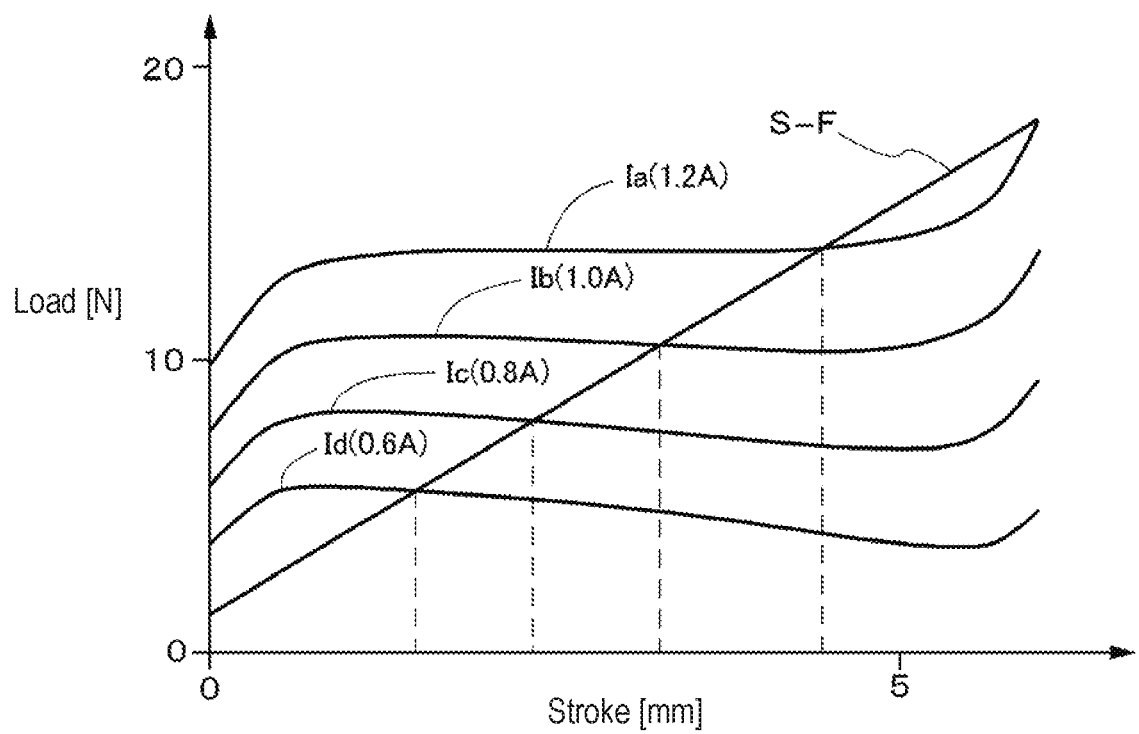
FIG. 14 is a graph illustrating a characteristic calculating process.
Figure 15:
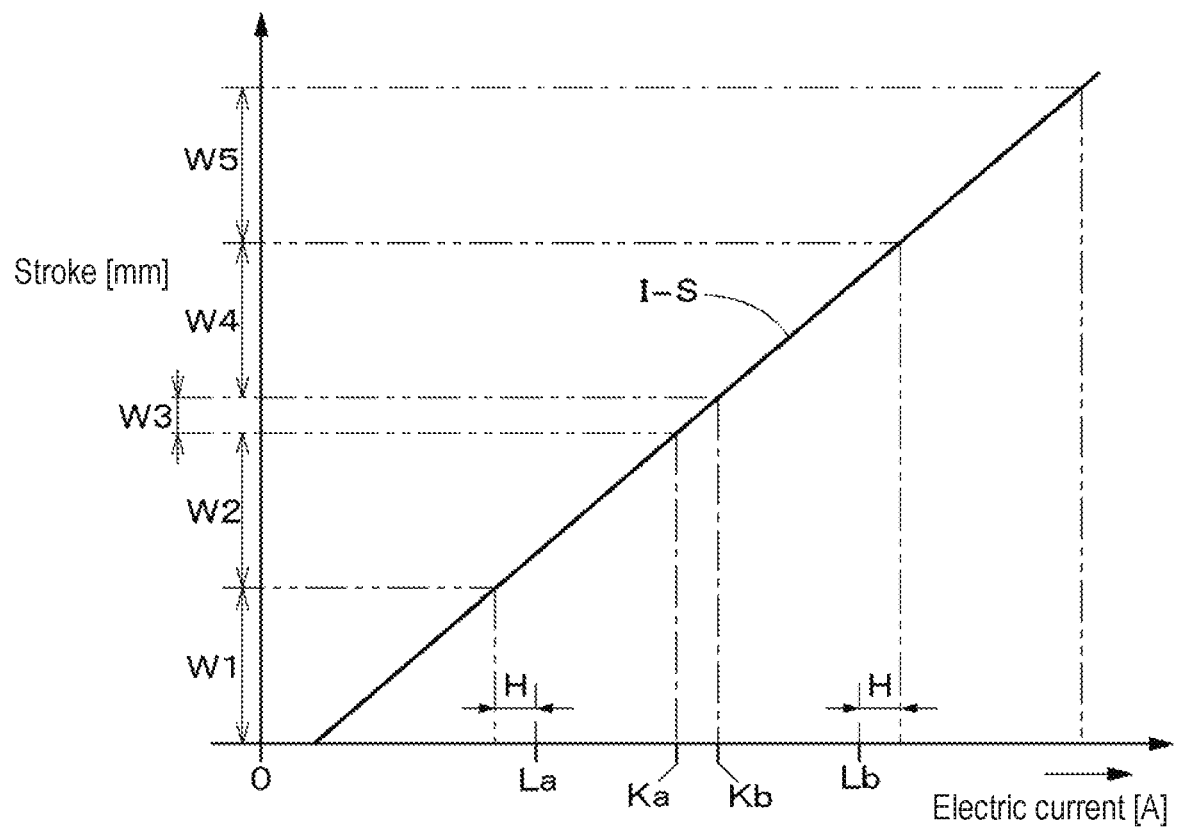
FIG. 15 is a graph illustrating a stroke characteristic relative to an electric current.

Next, a stroke characteristic relative to an electric current (I-S) shown in FIG. 15 is obtained by the calculation through a process shown in FIG. 14 based on the solenoid electromagnetic characteristics and the load characteristic of the valve relative to the stroke (Step S03).

The characteristic operation process shown in FIG. 14 illustrates visualization of a part of the operation in Step S03. In this process, the aforementioned solenoid electromagnetic characteristics and the load characteristic of the valve relative to the stroke are combined with each other, and the electric current value is determined based on points where the graphs of the load characteristic of the valve relative to the stroke (S-F) and the plural graphs Ia, Ib, Ic, Id are intersected with one another.

This combination shows the visualized explanation, and specifically, a process in which an intersection points of a formula of graphs configuring the solenoid electromagnetic characteristics and a formula of graphs of load characteristic of the value relative to the stroke is calculated by the calculation is performed.

In the graph of stroke characteristic relative to the electric current (I-S) shown in FIG. 15, the longitudinal axis corresponds to the stroke (mm), and the lateral axis corresponds to the electric current value (expressed in the unit A (ampere)). Required electric current values for operating the spools 55 at each of the first lock region W1, the advanced-angle region W2, the retention region W3, the retarded-angle region W4, and the second lock region W5 are determined by the stroke characteristic relative to the electric current (I-S).

From this principle, an actual boundary (a mechanical boundary) between the first lock region W1 and the advanced-angle region W2 is calculated, and as illustrated in FIG. 3, the first boundary electric current value La which is displaced by a setting value H shifted to the advanced-angle side (the side where the electric current increases) with reference to the electric current value of the actual boundary is specified. Similarly, the actual boundary (the mechanical boundary) between the retarded-angle region W4 and the second lock region W5 is calculated, and the second boundary electric current value Lb which is displaced by the setting value H to the retarded-angle side (the side where the electric current decreases) with reference to the electric current value of the actual boundary is specified (Step S04).

Then, the first retention boundary electric current value Ka supporting the boundary of the advanced-angle side of the retention region W3, and the second retention boundary electric current value Kb supporting the boundary of the side of the retarded-angle region W4 are specified (Step S05).

Then, the stroke characteristic relative to the electric current (I-S), the first boundary electric current value La, the second boundary electric current value Lb, the first retention boundary electric current value Ka, and the second retention boundary electric current value Kb specified as above are written in the non-volatile memory of the boundary memory portion 16 by the characteristic calculation portion 18 (Step S06). As a process in Step S06, for example, two retention electric current values (greater than the first retention boundary electric current value Ka and less than the second retention boundary electric current value Kb) securely setting the spool 55 at the retention region W3 by, for example, the calculation based on the first retention boundary electric current value K and the second retention boundary electric current value Kb may be calculated, and the two retention electric current values may be memorized in the boundary memory portion 16 by being changed to the first retention boundary electric current value Ka and the second retention boundary electric current value Kb.

As such, the stroke characteristic relative to the electric current (I-S), the first boundary electric current value La, the second boundary electric current value Lb, the first retention boundary electric current value Ka, and the second retention boundary electric current value Kb are memorized to the boundary memory portion 16, and accordingly, in a case of obtaining the target phase information, the phase control unit B sets the electric current value to be outputted by calculating with the stroke characteristic relative to the electric current (I-S) based on the target phase information and the relative rotation phase detected by the phase detecting portion T.

In a case where the opening of the advanced-angle port PA is increased to displace the relative rotation phase in high speed, an inconvenience (mislock state) in which the relative rotation phase is shifted to the lock state unintentionally may be solved by referring to the first boundary electric current value La. Similarly, in a case where the opening of the retarded-angle port PB is set to be increased, the inconvenience (mislocks state) in which the relative rotation phase is shifted to the lock state unintentionally may be solved by referring to the second boundary electric current value Lb. Accordingly, the operating oil may be supplied and discharged with the wide opening, and the responsive control may be achieved.

In a case where the relative rotation phase reaches the target phase by the control (including a case where the deviation of the relative rotation phase and the target phase is decreased), the electric current between the first retention boundary electric current value Ka and the second retention boundary electric current value Kb is outputted to securely stop the displacement of the relative rotation phase.

In this configuration, the relative rotation phase may be controlled in high precision by the setting of the electric current value by the PWM output portion 17 without the use of the electric current sensor detecting the electric current supplied to the electromagnetic solenoid Va.

A modified example of the embodiment will hereunder be explained. That is, the disclosure may be configured as below in addition to the aforementioned embodiment. The components including the same function as those described in the embodiment are described with the same reference numerals.

According to the embodiment, the spool 55 may be set at the five regions which are from the first lock region W1 to the second lock region W5. Alternatively, the variable valve timing control device A may be configured such that one of the first lock region W1 and the second lock region W5 may not be provided, that is, the spool 55 may be set at the four regions.

This modified example shall be configured such that one of the first boundary electric current value La and the second boundary electric current value Lb is set, however, the control mode may be set similarly to the control mode disclosed in the embodiment.

According to the embodiment, the first boundary electric current value La and the second boundary electric current value Lb are specified based on the setting value H. Alternatively, the setting value H shall not be specified at a predetermined value, and for example, a value considering the deterioration of a coil based on the performance of the coil employed at the electromagnetic solenoid Va, or a value considering, for example, a distance where the spool 55 does not operate properly even though the electromagnetic solenoid Va is energized, and these values may be applied as variables supporting the performance.

The electromagnetic control valve V may be configured such that the control region of the spool 55 is set at four regions which are from the first lock region W1 to the retarded-angle region W4 of the embodiment, or the control region of the spool 55 may be set at regions corresponding to the four regions which are from the advanced-angle region W2 to the second lock region W5 of the embodiment.

As such, even the lock region is provided at one of the end portions of the operation region of the spool 55, the boundary electric current value (the duty ratio value) may be set.

The invention is applicable to the variable valve timing control device including the control valve of the electromagnetic type controlling the phase control and the lock mechanism by the fluid pressure level.

According to the aforementioned embodiment, the variable valve timing control device (A) includes the driving-side rotational member (20) rotating synchronously with the crankshaft (1) of the internal combustion engine (E), the driven-side rotational member (30) arranged coaxially with the rotation axis (X) of the driving-side rotational member (20) and rotating integrally with the camshaft (5) which is configured to open and close the valve, the advanced-angle chamber (Ca) formed between the driving-side rotational member (20) and the driven-side rotational member (30), the retarded-angle chamber (Cb) formed between the driving-side rotational member (20) and the driven-side rotational member (30), the lock mechanism (L) including the lock recessed portion (27) formed at one of the driving-side rotational member (20) and the driven-side rotational member (30), the biasing member (26), and the lock member (25) formed at the other of the driving-side rotational member (20) and the driven-side rotational member (30), the lock member (25) engageable with the lock recessed portion (27) by the biasing force of the biasing member (26) so as to shift the relative rotation phase of the driving-side rotational member (20) and the driven-side rotational member (30) to the lock state between the most retarded-angle phase and the most advanced-angle phase, and the electromagnetic control valve (V) controlling the fluid to be supplied to and discharged from the advanced-angle chamber (Ca), the retarded-angle chamber (Cb), and the lock recessed portion (27). The electromagnetic control valve (V) includes the spool (55) controlling supply and discharge of the fluid, and the electromagnetic solenoid (Va) operating the spool (55) against the biasing force of the spring (56) by coming in contact with the outer end of the spool (55). The spool (55) includes operating regions which are the phase control region (W2, W4) where the spool (55) supplies the fluid to one of the advanced-angle chamber (20) and the retarded-angle chamber (30) in a state where the spool (55) supplies the fluid to the lock recessed portion (27), and the lock region (W1, W5) where the spool (55) supplies the fluid to one of the advanced-angle chamber (20) and the retarded-angle chamber (30) in a state where the spool (55) discharges the fluid from the lock recessed portion (27). The variable valve timing control device (A) further includes the phase detecting portion (T) detecting the relative rotation phase, the phase control portion (15) driving the electromagnetic solenoid (Va) while obtaining the detection signal detected by the phase detecting portion (T) to set the spool (55) to one of the phase control region (W1, W5) and the lock region (W2, W4), the boundary memory portion (16) memorizing the boundary electric current value (La, Lb) for referring the boundary between the phase control region (W1, W5) and the lock region (W2, W4) when the phase control portion (15) operates the phase control, and the characteristic calculation portion (18) obtaining the boundary electric current value (La, Lb) by calculation, the boundary electric current value (La, Lb) supporting the boundary between the phase control region (W1, W5) and the lock region (W2, W4) based on solenoid characteristic information of the electromagnetic solenoid (Va) and valve characteristic information of the electromagnetic control valve (V), the characteristic calculation portion (18) memorizing the boundary electric current value (La, Lb) to the boundary memory portion (16).

According to the aforementioned configuration, the characteristic calculation portion calculates the boundary electric current value supporting the boundary between the phase control region and the lock region based on solenoid characteristic information of the electromagnetic solenoid and valve characteristic information of the electromagnetic control valve, and memorizes the boundary electric current value to the boundary memory portion. That is, the solenoid characteristic information and the valve characteristic information vary when being manufactured, and in a case where the electromagnetic control valve is manufactured by simply combining the solenoid characteristic information and the valve characteristic information, the operating amount of the spool relative to the electric current driving the electromagnetic valve may differ from a previously assumed value. On the other hand, because the boundary electric current value when each of the characteristic information is combined is calculated by the calculation, a reasonable boundary electric current value may be obtained by supporting any combination without having a learning process. The boundary memory portion memorizes the boundary electric current value and avoids mislock by the setting of the electric current value supplied to the electromagnetic solenoid by referring to the boundary electric current value memorized in the boundary memory portion in a case where the phase control is operated. Accordingly, the variable valve timing control device may easily set the boundary between the phase control region and the lock region by the control valve including the spool operated by the electromagnetic solenoid.

According to the aforementioned embodiment, the boundary electric current value (La, Lb) is specified by being displaced in the direction included in the phase control region (W1, W5) by the predetermined amount based on a calculation result calculated by the characteristic calculation portion (18).

Accordingly, because the boundary electric current value is specified by being displaced to the phase control region based on the actual boundary between the phase control region and the lock region, the inconvenience of the mislock state when the phase control is performed may be solved.

According to the aforementioned embodiment, the characteristic calculation portion (18) calculates the retention boundary electric current value (Ka, Kb) supporting the boundary between the advanced-angle side and the retarded-angle side of the retention region (W3) where the spool (55) is inhibited from supplying and discharging the fluid to and from the advanced-angle chamber (20) and the retarded-angle chamber (30), the characteristic calculation portion (18) memorizing at least one of the retention boundary electric current value (Ka, Kb) and the retention electric current value (La, Lb) calculated based on the retention boundary electric current value (Ka, Kb) to the boundary memory portion (16).

According to the aforementioned configuration, the characteristic calculation portion sets the retention boundary electric current value or the retention electric current value supporting the boundary between the advanced-angle side and the retarded-angle side of the retention region where the fluid is not supplied to and discharged from the advanced-angle chamber and the retarded-angle chamber to stop the relative rotation so as to securely control for stopping the relative rotation phase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A variable valve timing control device, comprising:
  a driving-side rotational member rotating synchronously with a crankshaft of an internal combustion engine;
  a driven-side rotational member arranged coaxially with a rotation axis of the driving-side rotational member and rotating integrally with a camshaft which is configured to open and close a valve;
  an advanced-angle chamber formed between the driving-side rotational member and the driven-side rotational member;
  a retarded-angle chamber formed between the driving-side rotational member and the driven-side rotational member;
  a lock mechanism including
    a lock recessed portion formed at one of the driving-side rotational member and the driven-side rotational member;
    a biasing member; and
    a lock member formed at the other of the driving-side rotational member and the driven-side rotational member, the lock member engageable with the lock recessed portion by a biasing force of the biasing member so as to shift a relative rotation phase of the driving-side rotational member and the driven-side rotational member to a lock state between a most retarded-angle phase and a most advanced-angle phase; and
  an electromagnetic control valve controlling a fluid to be supplied to and discharged from the advanced-angle chamber, the retarded-angle chamber, and the lock recessed portion, wherein
  the electromagnetic control valve includes
    a spool controlling supply and discharge of the fluid; and
    an electromagnetic solenoid operating the spool against a biasing force of a spring by coming in contact with an outer end of the spool;
  the spool includes operating regions which are
    a phase control region where the spool supplies the fluid to one of the advanced-angle chamber and the retarded-angle chamber in a state where the spool supplies the fluid to the lock recessed portion; and
    a lock region where the spool supplies the fluid to one of the advanced-angle chamber and the retarded-angle chamber in a state where the spool discharges the fluid from the lock recessed portion;
  the variable valve timing control device further comprising:
    a phase detecting portion detecting the relative rotation phase;
    a phase control portion driving the electromagnetic solenoid while obtaining a detection signal detected by the phase detecting portion to set the spool to one of the phase control region and the lock region; and
  a boundary memory portion memorizing a boundary electric current value for referring a boundary between the phase control region and the lock region when the phase control portion operates a phase control; and
  a characteristic calculation portion obtaining the boundary electric current value by calculation, the boundary electric current value supporting the boundary between the phase control region and the lock region based on solenoid characteristic information of the electromagnetic solenoid and valve characteristic information of the electromagnetic control valve, the characteristic calculation portion memorizing the boundary electric current value to the boundary memory portion.

2. The variable valve timing control device according to claim 1, wherein the boundary electric current value is specified by being displaced in a direction included in the phase control region by a predetermined amount based on a calculation result calculated by the characteristic calculation portion.

3. The variable valve timing control device according to claim 1, wherein the characteristic calculation portion calculates a retention boundary electric current value supporting a boundary between an advanced-angle side and a retarded-angle side of a retention region where the spool is inhibited from supplying and discharging the fluid to and from the advanced-angle chamber and the retarded-angle chamber, the characteristic calculation portion memorizing at least one of the retention boundary electric current value and the retention electric current value calculated based on the retention boundary electric current value to the boundary memory portion.

4. The variable valve timing control device according to claim 1, wherein the solenoid characteristic information is manufacturing-variance information of the electromagnetic solenoid.

5. The variable valve timing control device according to claim 1, wherein the valve characteristic information is manufacturing-variance information of a valve unit of the electromagnetic control valve excluding the electromagnetic solenoid.

\* \* \* \* \*